US012804337B2

(12) United States Patent
Ridler

(10) Patent No.: US 12,804,337 B2
(45) Date of Patent: Nov. 17, 2026

(54) SYSTEM AND METHOD FOR WIRELESS COMMUNICATIONS WITH A MEDICAL IMPLANT

(71) Applicant: Cochlear Limited, Macquarie University (AU)

(72) Inventor: Oliver John Ridler, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 206 days.

(21) Appl. No.: 18/264,644

(22) PCT Filed: Mar. 7, 2022

(86) PCT No.: PCT/IB2022/052015

§ 371 (c)(1),
(2) Date: Aug. 8, 2023

(87) PCT Pub. No.: WO2022/189946

PCT Pub. Date: Sep. 15, 2022

(65) Prior Publication Data

US 2024/0121563 A1 Apr. 11, 2024

Related U.S. Application Data

(60) Provisional application No. 63/159,240, filed on Mar. 10, 2021.

(51) Int. Cl.
*H04R 25/00* (2006.01)

(52) U.S. Cl.
CPC ......... *H04R 25/609* (2019.05); *H04R 25/558* (2013.01); *H04R 2225/67* (2013.01)

(58) Field of Classification Search
CPC ............................ H04R 25/609; H04R 25/558
See application file for complete search history.

(56) References Cited

U.S. PATENT DOCUMENTS 5,991,664 A 11/1999 Seligman
6,671,559 B2 12/2003 Goldsmith et al.
(Continued)

FOREIGN PATENT DOCUMENTS

CN 104885481 9/2015
EP 0259906 10/1993
(Continued)

OTHER PUBLICATIONS

Extended European Search Report for Application No. 22766471.1 dated Jan. 14, 2025.
(Continued)

*Primary Examiner* — Carolyn R Edwards
*Assistant Examiner* — Dylan Maguire Neece
(74) *Attorney, Agent, or Firm* — Knobbe, Martens, Olson & Bear, LLP

(57) ABSTRACT

An apparatus includes at least one communication circuit configured to receive transducer output signals generated by at least one transducer, to generate communication signals in response to the transducer output signals, and to inductively communicate the communication signals to at least one device implanted on or within a recipient. The at least one communication circuit includes at least one core configured to be positioned within a cavity or region of the recipient's body and that includes a first portion and a second portion. The first portion extends along a longitudinal axis and the second portion extends outwardly from the first portion and substantially perpendicular to the longitudinal axis. The at least one communication circuit further includes at least one electrically conductive coil encircling the first portion and configured to be positioned within the cavity or region.

27 Claims, 12 Drawing Sheets

(56) References Cited

U.S. PATENT DOCUMENTS

| | | | |
|---|---|---|---|
| 7,382,221 | B2 | 6/2008 | Morimoto et al. |
| 7,974,700 | B1 | 7/2011 | Gibson |
| 8,193,892 | B2 | 6/2012 | Ukawa et al. |
| 9,132,276 | B2 | 9/2015 | Meskens |
| 9,802,043 | B2 | 10/2017 | Von Ilberg et al. |
| 2005/0159791 | A1 | 7/2005 | Daly et al. |
| 2010/0225174 | A1 | 9/2010 | Jiang |
| 2013/0165737 | A1 | 6/2013 | Van Den Heuvel |
| 2015/0343225 | A1 | 12/2015 | Leigh |
| 2017/0050023 | A1 | 2/2017 | Hillbratt et al. |
| 2019/0320269 | A1 * | 10/2019 | Haubrich ............... H01Q 1/273 |

FOREIGN PATENT DOCUMENTS

| | | | | |
|---|---|---|---|---|
| JP | 2003-332822 | | 11/2003 | |
| JP | 4277753 | | 4/2005 | |
| JP | 2007-116609 | | 5/2007 | |
| JP | 2007-306198 | | 11/2007 | |
| JP | 2009-289995 | | 12/2009 | |
| TW | 200509459 | | 3/2005 | |
| WO | WO 2007/130176 | A1 | 11/2007 | |
| WO | WO 2018/126062 | | 7/2018 | |
| WO | WO-2018126062 | A1 * | 7/2018 | ............. A61N 1/378 |
| WO | WO 2019/142079 | A1 | 7/2019 | |
| WO | WO 2020/071272 | | 4/2020 | |

OTHER PUBLICATIONS

International Search Report and Written Opinion for PCT Application No. PCT/IB2022/052015 dated Jun. 10, 2022 in 12 pages.

Chinese Office Action for Counterpart Application No. CN 202280019034.8, dated Apr. 14, 2026, in 7 pages.

Chinese Search Report for Counterpart Application No. CN 202280019034.8 dated Apr. 8, 2026, in 2 pages.

* cited by examiner

SYSTEM AND METHOD FOR WIRELESS COMMUNICATIONS WITH A MEDICAL IMPLANT

BACKGROUND

Field

The present application relates generally to systems and methods for wireless communications with a medical implant, and more particularly for wireless communications between an implantable portion of an auditory prosthesis and a portion of the auditory prosthesis within the ear canal.

Description of the Related Art

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In one aspect disclosed herein, an apparatus is provided which comprises at least one communication circuit configured to receive transducer output signals generated by at least one transducer, to generate communication signals in response to the transducer output signals, and to inductively communicate the communication signals to at least one device implanted on or within a recipient. The at least one communication circuit comprises at least one core configured to be positioned within a cavity or region of the recipient's body. The at least one core comprises a first portion and a second portion, the first portion extending along a longitudinal axis and the second portion extending outwardly from the first portion and substantially perpendicular to the longitudinal axis. The at least one communication circuit further comprises at least one electrically conductive coil encircling the first portion and configured to be positioned within the cavity or region.

In another aspect disclosed herein, an apparatus is provided which comprises at least one antenna configured to generate time-varying magnetic fields that inductively couple the at least one antenna to an implanted device on or within a recipient. The at least one antenna comprises a first magnetic pole surface configured to be facing in a direction substantially towards the implanted device. The at least one antenna further comprises a second magnetic pole surface configured to be facing substantially perpendicular to the direction.

In still another aspect disclosed herein, a method is provided which comprises generating a time-varying magnetic field between a first magnetic pole surface and a second magnetic pole surface of a first device positioned on or within a recipient's body. The second magnetic pole surface is substantially perpendicular to the first magnetic pole surface. The method further comprises receiving, at an implanted second device within the recipient's body, at least a portion of the time-varying magnetic field. The method further comprises controlling operation of the implanted second device in response to the received portion of the time-varying magnetic field.

BRIEF DESCRIPTION OF THE DRAWINGS

Implementations are described herein in conjunction with the accompanying drawings, in which.

DETAILED DESCRIPTION

Figure 1:
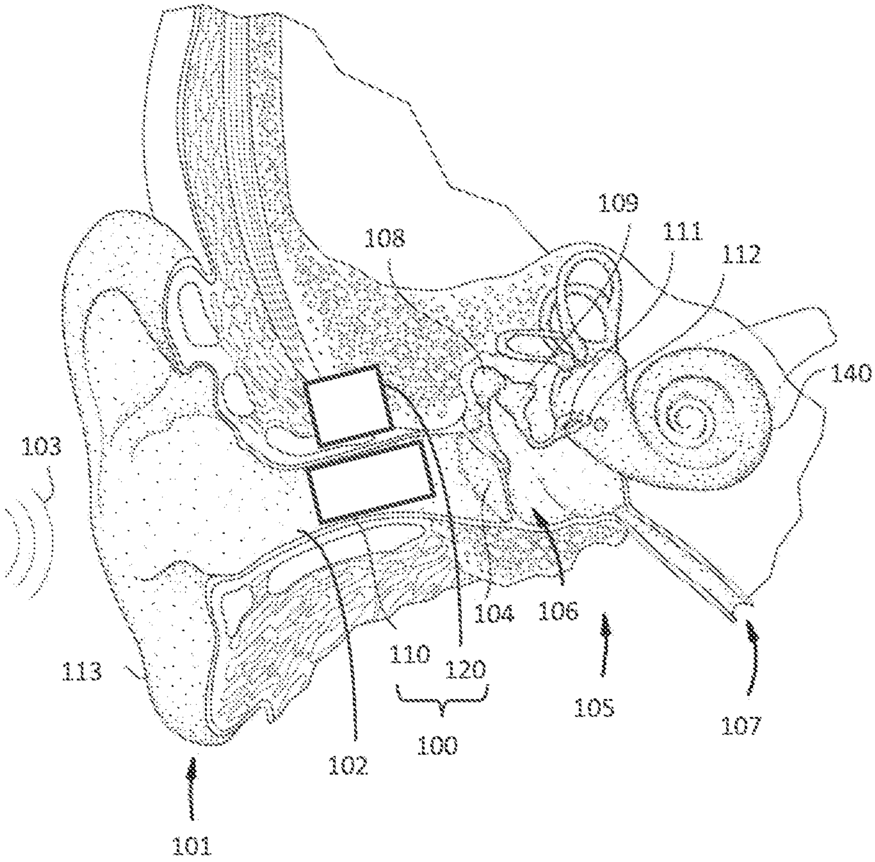
FIG. 1 schematically illustrates an example auditory prosthesis in accordance with certain implementations described herein.

Certain implementations described herein provides an apparatus (e.g., medical device or system) configured to provide wireless communication between a first element within a cavity or region of a recipient's body and a separate second element implanted within the recipient's body. The first element comprises a communication circuit (e.g., antenna) having an antenna core that is extended substantially perpendicularly to a longitudinal axis of the antenna core and that has a form factor configured to fit within the cavity or region (e.g., within an ear canal of the recipient). The communication circuit is configured to provide a predetermined magnetic induction coupling coefficient k between the first and second elements and through intervening tissue (e.g., ear canal wall tissue; other tissue) with a second communication circuit (e.g., antenna) of the implanted second element, the value of k sufficient for efficient power transfer between the first element and the second element (e.g., a value of k greater than or equal to 0.10 for a second element separated from the antenna core by 5 millimeters). In certain implementations, the antenna core is elongate along an elongation direction and is configured to improve the ability of the apparatus to accommodate misalignment along the elongation direction while retaining a magnetic induction coupling coefficient k sufficient for efficient power transfer between the first and second elements (e.g., a value of k greater than or equal to 0.10 for a second element separated from the antenna core by 5 millimeters).

The teachings detailed herein are applicable, in at least some implementations, to any type of implantable medical system (e.g., implantable sensor prostheses; implantable stimulation system; implantable medicament administration system) comprising a first portion (e.g., implanted on or within the recipient's body or external to the recipient's body) and a second portion (e.g., implanted on or within the recipient's body) configured to provide stimulation signals and/or medicament dosages to a portion of the recipient's body in response to information and/or control signals received from the first portion. For example, the implantable medical system can comprise an auditory prosthesis system configured to generate and apply stimulation signals that are perceived by the recipient as sounds (e.g., evoking a hearing percept). Merely for ease of description, apparatus and methods disclosed herein are primarily described with reference to an illustrative auditory prosthesis system, namely a cochlear implant. Examples of other auditory prosthesis systems compatible with certain implementations described herein include but are not limited to: acoustic hearing aids, bone conduction devices (e.g., active and passive transcutaneous bone conduction devices; percutaneous bone conduction devices), middle ear auditory prostheses, direct acoustic stimulators, other electrically simulating auditory prostheses (e.g., auditory brain stimulators), and/or combinations or variations thereof. Other sensory prosthesis systems that are configured to evoke other types of neural or sensory (e.g., sight, tactile, smell, taste) percepts are compatible with certain implementations described herein, including but are not limited to: vestibular devices (e.g., vestibular implants), visual devices (e.g., bionic eyes), visual prostheses (e.g., retinal implants), somatosensory implants, and chemosensory implants.

The teachings detailed herein and/or variations thereof may also be used with a variety of other medical devices that provide a wide range of therapeutic benefits to recipients, patients, or other users. In some implementations, the teachings detailed herein and/or variations thereof can be utilized in other types of implantable medical devices beyond sensory prostheses. For example, apparatus and methods disclosed herein and/or variations thereof can be used with one or more of the following: sensors; cardiac pacemakers; drug delivery systems; defibrillators; functional electrical stimulation devices; catheters; brain implants; seizure devices (e.g., devices for monitoring and/or treating epileptic events); sleep apnea devices; electroporation; pain relief devices; etc. Implementations can include any type of medical system that can utilize the teachings detailed herein and/or variations thereof (e.g., systems that may benefit from a first portion able to fit within a region having restricted space and in wireless communication with an implanted second portion).

FIG. 1 schematically illustrates an example auditory prosthesis 100 (e.g., a cochlear implant; a bone conduction auditory prosthesis; a middle ear auditory prosthesis; an auditory brainstem implant; a direct acoustic stimulator prosthesis; any combination thereof) compatible with certain embodiments described herein. The example auditory prosthesis 100 comprises a first element 110 configured to be positioned within the ear canal 102 of the recipient and an implantable second element 120 that is implanted in the mastoid cavity adjacent to the ear canal 102 and configured to be capable of wireless communication with the first element 110 and capable of operative communication with a portion of the recipient's auditory system. The first element 110 is configured to generate information indicative of sound detected by a microphone (e.g., a microphone external to the ear canal 102 positioned on the ear, off the ear, or implanted under the skin behind the ear; an in-the-ear-canal (ITEC) microphone within the ear canal 102) and to use magnetic inductive communications for wirelessly transmitting the information and/or power to the second element 120. The second element 120 is configured to generate excitation signals in response to the information wirelessly received from the first element 110 within the ear canal 102 and to transmit the excitation signals to the recipient's auditory system (e.g., using one or more electrodes and/or actuators, not shown in FIG. 1).

As used herein, a recipient's auditory system includes all sensory system components used to perceive a sound signal, such as hearing sensation receptors, neural pathways, including the auditory nerve and spiral ganglion, and the regions of the brain used to sense sound. For example, as shown in FIG. 1, the recipient normally has an outer ear 101, a middle ear 105, and an inner ear 107. In a fully functional ear, the outer ear 101 comprises an auricle 113 and an ear canal 102. An acoustic pressure wave (e.g., sound) 103 is collected by the auricle 113 and is channeled into and through the ear canal 102. Disposed across the distal end of the ear canal 102 is a tympanic membrane 104 which vibrates in response to the sound 103. This vibration is coupled to oval window or fenestra ovalis 112 through three bones of middle ear 105, collectively referred to as the ossicles 106 and comprising the malleus 108, the incus 109, and the stapes 111. The bones 108, 109, and 111 of the middle ear 105 serve to filter and amplify the sound 103, causing the oval window 112 to articulate, or vibrate in response to vibration of the tympanic membrane 104. This vibration sets up waves of fluid motion of the perilymph within the cochlea 140. Such fluid motion, in turn, activates tiny hair cells (not shown) inside the cochlea 140. Activation of the hair cells causes appropriate nerve impulses to be generated and transferred through the spiral ganglion cells (not shown) and auditory nerve 114 to the brain (also not shown) where they are perceived as sound. An auditory prosthesis in accordance with certain implementations described herein provides a functionality which replaces or supplements a missing or malfunctioning aspect of a recipient's non-fully functioning auditory system.

For some auditory prosthesis 100 (e.g., cochlear implants), the first element 110 is inside the ear canal 102 and the second element 120 is implanted in the mastoid cavity adjacent to the ear canal 102. However, by virtue of the distance across which the trans-canal RF communication link extends between the first and second elements 110, 120, it can be difficult to achieve a sufficient magnetic induction coupling coefficient k between the first and second elements 110, 120 that provides sufficient power transfer efficiency, battery life, and/or sound processor size. For example, a known cochlear implant has a magnetic induction coupling coefficient k between 0.35 (corresponding to an RF link efficiency of about 42%) for a skin flap thickness of 1 millimeter and 0.1 (corresponding to an RF link efficiency of about 20%) for a skin flap thickness of 10 millimeters. The magnetic induction coupling coefficient k between two circuits can be expressed as: $k=M/\sqrt{L_1L_2}$, where M is the mutual inductance between the two circuits and $L_1$ and $L_2$ are the inductances of the two circuits. The magnetic induction coupling coefficient k reflects how well the magnetic flux generated by one circuit is captured by the other circuit, with a higher value of k resulting in a higher voltage generated by the circuit receiving the magnetic flux for a given drive voltage at the circuit transmitting the magnetic flux. The small size of the ear canal 102 constrains the size of the antenna coil in the first element 110 and therefore the ability to achieve sufficient magnetic induction coupling coefficients, since the magnetic induction coupling coefficient k is dependent upon the size of the antenna coils of the first and second elements 110, 120, and previous efforts have not achieved magnetic induction coupling coefficients greater than 0.1.

In addition, the first element 110 of such prostheses 100 can use the anatomy of the ear canal 102 to assist with correctly positioning the first element 110 relative to the second element 120 to facilitate wireless communication between them (e.g., instead of, or in conjunction with, magnets in the first and second elements 110, 120 to assist with the positioning). However, there can still be variation or misalignment of the first element 110 (e.g., due to movement during operation and/or variation when being inserted into the ear canal 102). Such variation and/or misalignment can further decrease the magnetic induction coupling coefficient and the RF link efficiency.

Figure 2:
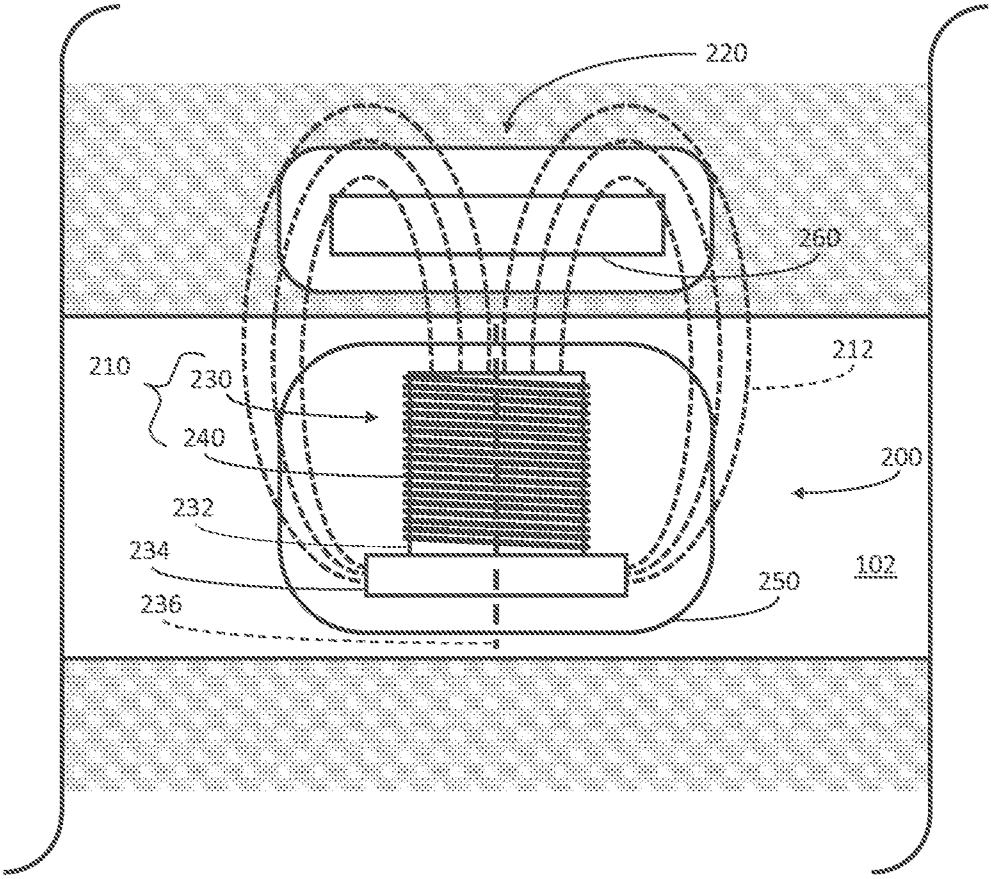
FIG. 2 schematically illustrates an example apparatus in accordance in accordance with certain implementations described herein.

FIG. 2 schematically illustrates an example apparatus 200 in accordance with certain implementations described herein. The apparatus 200 comprises at least one communication circuit 210 configured to receive transducer output signals generated by at least one transducer (not shown), to generate communication signals 212 in response to the transducer output signals, and to inductively communicate the communication signals 212 to at least one device 220 implanted on or within a recipient. The at least one communication circuit 210 comprises at least one core 230 configured to be positioned within a cavity or region of the recipient's body (e.g., an ear canal 102 of the recipient's body). The at least one core 230 comprises a first portion 232 and a second portion 234. The first portion 232 extends along a longitudinal axis 236 and the second portion 234 extends outwardly from the first portion 232 and is substantially perpendicular to the longitudinal axis 236. The apparatus 200 further comprises at least one electrically conductive coil 240 encircling the first portion 232 and configured to be positioned within the cavity or region.

In certain implementations, the apparatus 200 comprises a housing 250 configured to be positioned within the cavity or region of the recipient's body (e.g., within an ear canal 102), and the at least one core 230 and the at least one electrically conductive coil 240 are positioned on or within the housing 250. The housing 250 of certain implementations comprises a biocompatible and non-magnetic material (e.g., plastic, ceramic, titanium, titanium alloy). In certain implementations, the housing 250 is configured to be repeatedly inserted into and positioned within the cavity or region (e.g., by the recipient or user; prior to operation of the apparatus 200) with the longitudinal axis 236 pointing towards an inner surface of the cavity or region (e.g., towards the at least one device 220), and repeatedly removed from the cavity or region (e.g., by the recipient or user; for cleaning or maintenance of the apparatus 200).

The housing 250 of certain implementations can be configured to be comfortably worn within the cavity or region (e.g., within the ear canal 102) by the recipient for an extended period of time (e.g., hours; days; weeks; etc.) while remaining substantially stationary relative to the cavity or region (e.g., not appreciably moving within the cavity or region despite accelerations or other movements of the recipient's body). In certain implementations, the housing 250 has a shape which conforms to the shape of the portion of the ear canal 102 in which the housing 250 is intended to reside during operation. For example, the housing 250 can be configured to be molded prior to insertion so as to conform to the shape of the portion of the ear canal 102 in which the housing 250 is intended to reside during operation. For another example, the housing 250 can comprise a compliant material that is configured to be modified (e.g., by the process of positioning the housing 250 within the ear canal 102) to conform to the shape of the portion of the ear canal 102 in which the housing 250 is intended to reside. The housing 250 of certain implementations is positionable within the ear canal 102 so as to be sufficiently discrete such that the presence of the housing 250 within the ear canal 102 cannot be detected by casual observation by others. In certain implementations, the housing 250 has a tubular shape with one or more protrusions (e.g., fingers; ribs; rings; or similar structures) extending outwardly away from a longitudinal axis of the housing 250 and configured to contact an inner surface of the ear canal 102 to keep the apparatus 200 in place and aligned with the ear canal 102 (e.g., in alignment with at least one antenna circuit of the implanted device 220). The protrusions 218 of certain implementations are configured to allow sound to propagate past the apparatus 200 (e.g., through spaces between adjacent protrusions) to the tympanic membrane 104 of the recipient, thereby allowing the recipient to utilize residual hearing capabilities.

In certain implementations, the apparatus 200 further comprises the at least one transducer and the at least one transducer is on or within the housing 250, while in certain other implementations, the at least one transducer is spaced away from the housing 250 but is in operative communication with the at least one communication circuit 210 within the housing 250 (e.g., wirelessly; via a wired connection). In certain implementations, the at least one transducer comprises at least one microphone configured to generate output electrical signals indicative of the sound received by the at least one microphone at the recipient. The at least one microphone can be positioned externally to the ear canal 102 (e.g., on the ear, off the ear, or implanted under the skin behind the ear) or partially or fully within the ear canal 102 (e.g., an in-the-ear-canal (ITEC) microphone that is on or within the housing 250 within the ear canal 102). For example, the at least one microphone can comprise a passive microphone (e.g., a microphone which comprises a passive sensing component which utilizes power provided by the passive sensing component for operation; a microphone which does not utilize a battery or other power storage device to provide power for operation; an electret microphone; a piezoelectric microphone comprising a piezoelectric membrane). For another example, the at least one microphone can comprise a non-passive microphone (e.g., a microphone that utilizes power stored by a battery, capacitor, or other power storage device), examples of which include but are not limited to: optical microphones, condenser microphones, capacitor microphones, electromagnetic induction microphones, and dynamic microphones.

In certain implementations, the at least one microphone comprises a plurality of microphones configured to provide a predetermined total audio frequency response across a range of audio frequencies (e.g., a range up to 8 kHz, 10 kHz, or 20 kHz) by having each microphone provide a corresponding audio frequency response across a corresponding portion of the range of audible frequencies (e.g., a first microphone providing an audio frequency response across a first range with a lower bound of 100 Hz and a second microphone providing an audio frequency response across a second range with an upper bound of 10 kHz for a total audio frequency response across a range of audio frequencies between 100 Hz and 10 kHz). In certain implementations, the first range and the second range overlap one another (e.g., the upper bound of the first range is greater than the lower bound of the second range). In certain other implementations, the first range and the second range are adjacent to one another (e.g., the upper bound of the first range is equal to the lower bound of the second range). In certain other implementations, the first range and the second range are separated from one another (e.g., the upper bound of the first range is less than the lower bound of the second range).

In certain other implementations, the at least one transducer comprises at least one sensor configured to generate transducer output signals indicative of a sensed condition. For example, the at least one transducer can be selected from the group consisting of: at least one optical sensor configured to generate signals indicative of light received by the optical sensor (e.g., an imaging sensor); at least one accelerometer and/or gyroscope configured to generate signals indicative of acceleration and/or orientation of the recipient; at least one chemical sensor configured to generate signals indicative of a chemical compound in an environment of the recipient or within the recipient (e.g., glucose blood level).

In certain implementations, the at least one communication circuit 210 (e.g., at least one first antenna circuit) is configured to generate the communication signals 212 by generating a time-varying (e.g., sinusoidal) magnetic field H(t). In certain implementations, the communication signals 212 of the time-varying magnetic field H(t) are configured to transfer power and/or information from the apparatus 200 to the at least one device 220 which comprises at least one second antenna circuit 260 configured to receive at least a portion of the modulated time-varying magnetic field H(t) and to extract the power and/or information from the communication signals 212. For example, the communication signals 212 can comprise information regarding the transducer output signals and/or control signals can be encoded onto the time-varying magnetic field H(t) by modulating the time-varying magnetic field H(t) (via frequency modulations, amplitude modulations, phase modulations, and/or digital modulations). The at least one second antenna circuit 260 of certain such implementations is configured to inductively generate electrical signals in response to the received portion of the modulated time-varying magnetic field H(t), and to decode the information and/or control signals from the inductively generated electric signals, such that the communication signals 212 are inductively communicated to the at least one device 220. In certain implementations, the at least one communication circuit 210 is further configured to receive power and/or information (e.g., status information and/or control signals) from the at least one device 220 by receiving a time-varying magnetic field H(t) generated and modulated by the at least one device 220. Examples of the at least one second antenna circuit 260 include but are not limited to: dipole antennas, monopole antennas, loop antennas, spiral antennas, patch antennas, slot antennas, helical antennas, coil antennas, and phased arrays of antennas.

In certain implementations, the time-varying magnetic field H(t) has a spatial distribution that facilitates wireless communication (e.g., via a transcutaneous communication link; inductive radio frequency (RF) communication link) with the at least one device 220. For example, the spatial distribution can be rotationally symmetric (e.g., omnidirectional) about the longitudinal axis 236 or non-isotropic (e.g., comprising a lobe extending along a direction generally towards a location of the at least one device 220) and with sufficient magnetic flux received by the at least one second antenna circuit 260 to facilitate wireless communication with the at least one device 220.

In certain implementations, each of the first portion 232 and the second portion 234 of the at least one core 230 comprises a ferrimagnetic or ferromagnetic material (e.g., iron; iron alloy; magnetic stainless steel; ferrite). In certain implementations, the core 230 is a unitary (e.g., monolithic) element with the first portion 232 and the second portion 234 permanently joined to one another, while in certain other implementations, the first portion 232 and the second portion 234 are reversibly separatable and/or separate from one another. The first portion 232 can comprise a ferrite rod core and the second portion 234 can comprise a ferrite lip or flange extending radially away from an end of the ferrite rod core. In certain implementations, the at least one core 230 has a first magnetic pole surface 302 (e.g., surface of the first portion 232 spaced farthest away from the second portion 234) configured to be facing in a direction substantially towards the at least one device 220 and a second magnetic pole surface 304 configured to be facing substantially perpendicular to the direction in which the first magnetic pole surface 302 faces.

In certain implementations, the at least one coil 240 comprises multiple turns of electrically insulated single-strand or multi-strand wire (e.g., copper; platinum; gold). The at least one coil 240 is wound around at least part of the first portion 232 of the at least one core 230, with the number of windings in a range of 5 to 30 (e.g., 10 to 20). In certain implementations, the at least one coil 240 comprises a single layer of windings around the first portion 232, while in certain other implementations, the at least one coil 240 comprises multiple layers of windings around the first portion 232. By flowing a time-varying electrical current through the at least one coil 240, the time-varying magnetic field H(t) can be generated having a spatial distribution affected by the at least one core 230.

Figure 3A:
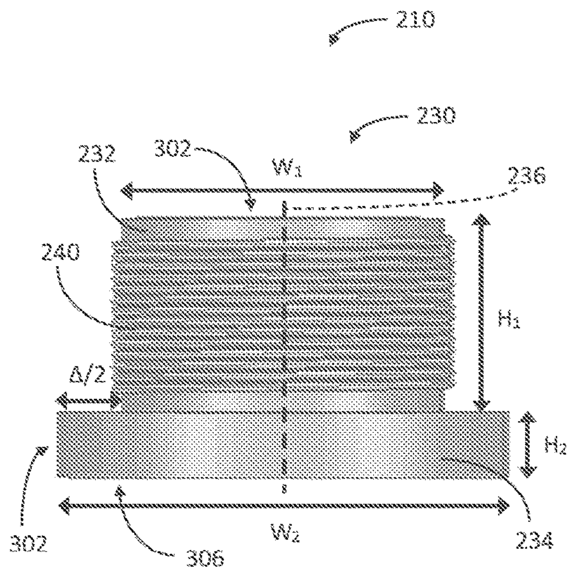
FIGS. 3A and 3B schematically illustrate a side view and a perspective view, respectively, of an example core and an example coil in accordance with certain implementations described herein.
Figure 3B:
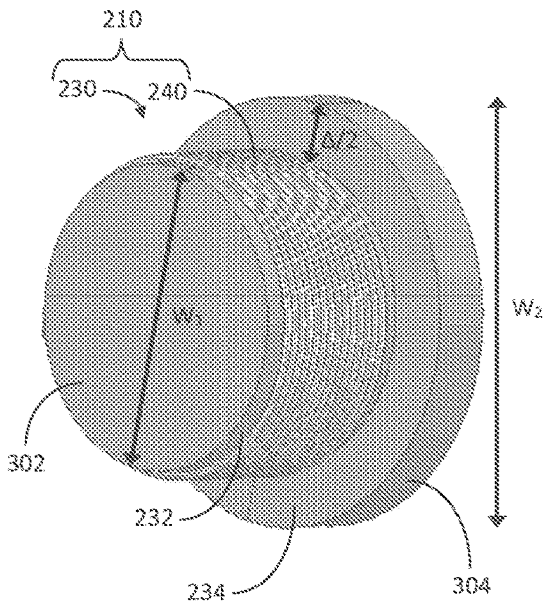
Figure 3C:
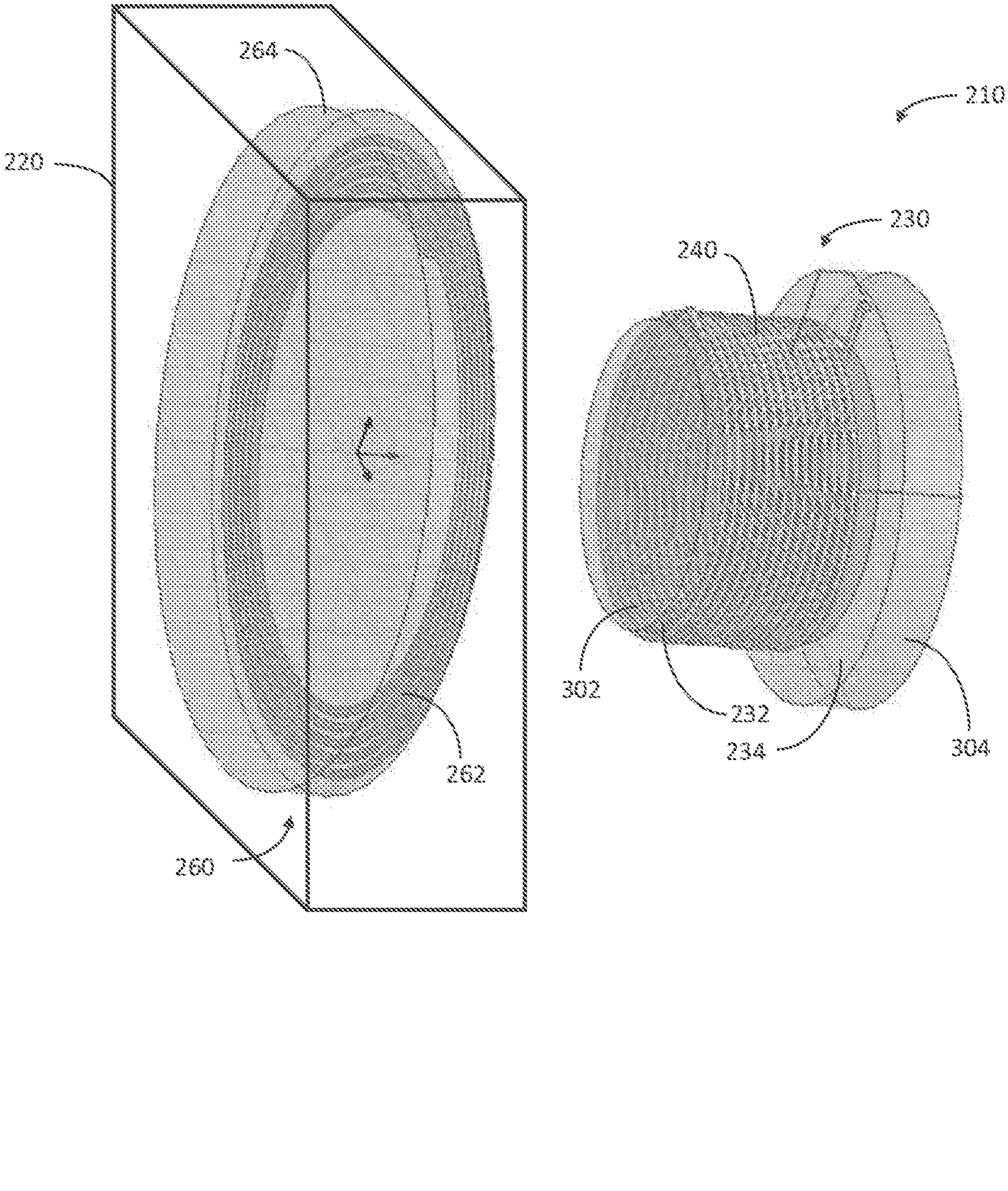
FIG. 3C schematically illustrates a perspective view of the example core and the example coil of FIGS. 3A and 3B oriented and positioned relative to an antenna circuit of an implanted device in accordance with certain implementations described herein.

FIGS. 3A and 3B schematically illustrate a side view and a perspective view, respectively, of an example communication circuit 210 in accordance with certain implementations described herein. FIG. 3C schematically illustrates a perspective view of the example core 230 and the example coil 240 of FIGS. 3A and 3B oriented and positioned relative to an antenna circuit 260 of an implanted device 220 in accordance with certain implementations described herein. Each of the first portion 232 and the second portion 234 of FIGS. 3A-3C has a substantially cylindrical shape extending along the longitudinal axis 236 and has a substantially circular cross-section in a plane perpendicular to the longitudinal axis 236 (e.g., is substantially rotationally symmetric about the longitudinal axis 236). The first magnetic pole surface 302 is substantially flat and substantially perpendicular to the longitudinal axis 236 and the second magnetic pole surface 304 is substantially perpendicular to the first magnetic pole surface 302 and extends around the longitudinal axis 236. A surface 306 of the second portion 234 that is opposite to the first magnetic pole surface 302 is also substantially flat and substantially perpendicular to the longitudinal axis 236.

In certain implementations, the dimensions of the first portion 232, the second portion 234, and the coil 240 are sized to provide a predetermined spatial distribution of the time-varying magnetic field H(t) while being configured to fit within a cavity or region of the recipient's body (e.g., within an ear canal 102). For example, the first portion 232 can have a width $W_1$ (e.g., diameter) in a range of 2 millimeters to 10 millimeters and/or a height $H_1$ in a range of 1.5 millimeters to 6 millimeters, the second portion 234 can have a width $W_2$ (e.g., diameter) in a range of 2.5 millimeters to 12 millimeters and/or a height $H_2$ in a range of 0.5 millimeters to 3 millimeters, and a difference $\Delta=W_2-W_1$ can be in a range of 0.5 millimeter to 4 millimeters.

Figure 4:
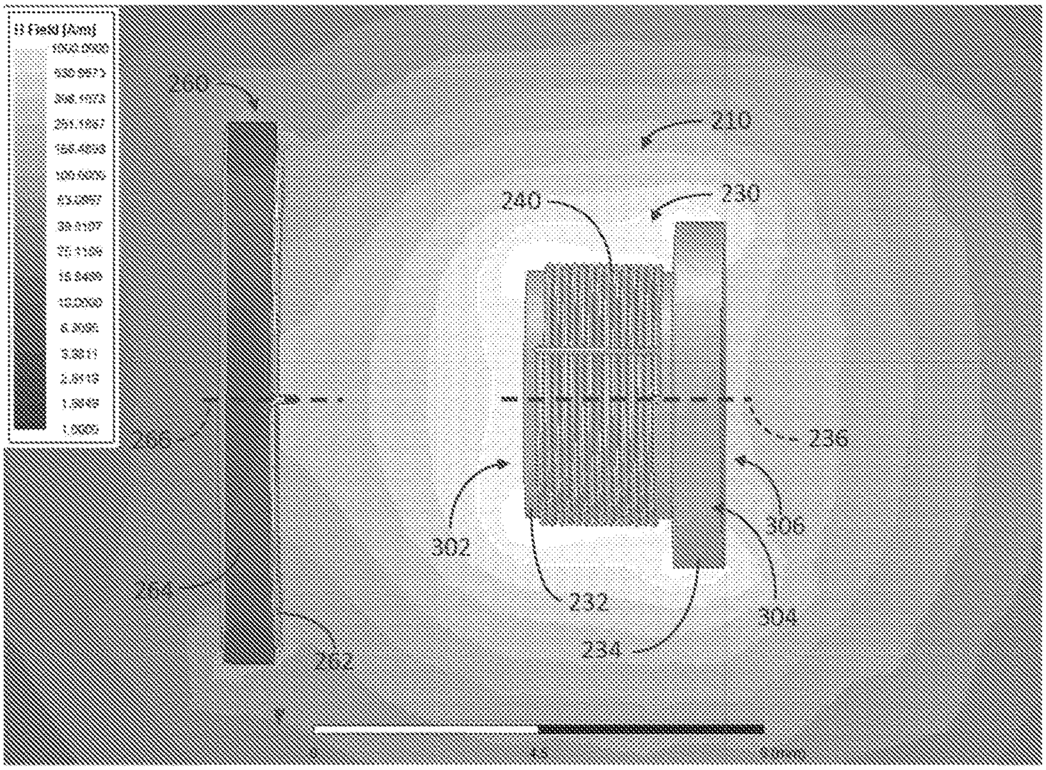
FIG. 4 illustrates a simulation of an example time-varying magnetic field H(t) generated by the example core and coil of FIGS. 3A-3C in accordance with certain implementations described herein.

FIG. 4 illustrates a simulation of an example time-varying magnetic field H(t) generated by the example communication circuit 210 of FIGS. 3A-3C in accordance with certain implementations described herein. The second antenna circuit 260 can comprise a planar spiral antenna coil 262 having a winding outer radius in a range of 5 millimeters to 20 millimeters, a winding inner radius in a range of 3 millimeters to 18 millimeters, and a disc-shaped antenna core 264 having an outer radius in a range of 5 millimeters to 20 millimeters and a thickness in a range of 0 to 3 millimeters. For this simulation, the second antenna circuit 260 comprises a planar spiral antenna coil 262 having five windings and a winding inner radius of 4.5 millimeters and a disc-shaped antenna core 264 having an outer radius of 5.5 millimeters and a thickness of 1 millimeter. The antenna coil 262 and antenna core 264 are centered on, perpendicular to, and rotationally symmetric about a longitudinal axis 266 that is colinear with the longitudinal axis 236. In addition, the first magnetic pole surface 302 faces and is spaced by 5 millimeters from the antenna coil 262, and the core 230 has the following dimensions: $W_1$=5 millimeters, $W_2$=7 millimeters, $H_1$=3 millimeters, and $H_2$=1 millimeter. The resulting time-varying magnetic field H(t) is rotationally symmetric about the longitudinal axis 236.

As shown in FIG. 4, the spatial distribution of the time-varying magnetic field H(t) extends from the first magnetic pole surface 302 to the second antenna circuit 260 of the device 220 with the magnitude in the region between the first magnetic pole surface 302 and the second antenna circuit 260 generally larger than the magnitude in the region on the opposite side of the core 230 from the first magnetic pole surface 302. By having the width (e.g., diameter) of the second portion 234 larger than the width (e.g., diameter) of the first portion 232, the second magnetic pole surface 304 extends away from the longitudinal axis 236 farther than does the first magnetic pole surface 302, thereby modifying the spatial distribution of the time-varying magnetic field H(t) such that the magnetic field H(t) is focused towards the second antenna circuit 260 and increasing a magnetic induction coupling coefficient between the communication circuit 210 and the device 220. For example, for an apparatus 200 within an ear canal 102 and the device 220 implanted at an opposite side from the inner surface of the ear canal 102, the magnetic induction coupling coefficient k can be greater than 0.1 (e.g., greater than or equal to 0.105; greater than or equal to 0.11; greater than or equal to 0.12) for a range of skin flap distances (e.g., a distance between the first magnetic pole surface 302 and the second antenna circuit 260 in a range of 1 millimeter to 10 millimeters; in a range of 3 millimeters to 8 millimeters; at 5 millimeters; at 8 millimeters) in accordance with certain implementations described herein. The magnetic induction coupling coefficient k for the example configuration shown in FIG. 4 is calculated to be 0.108 at a separation of 5 millimeters between the first magnetic pole surface 302 and the second antenna circuit 260.

Figure 5A:
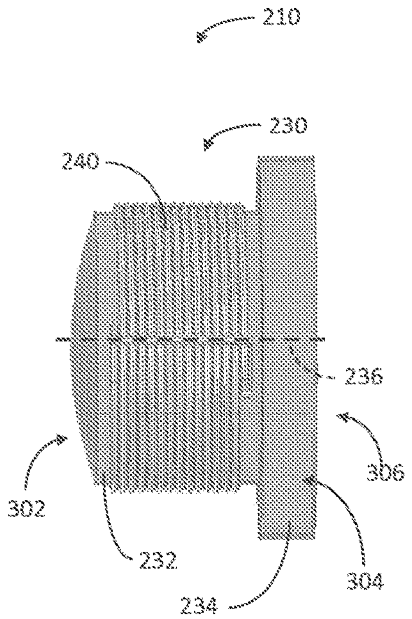
FIG. 5A schematically illustrates a side view of another example core and an example coil in accordance with certain implementations described herein.
Figure 5B:
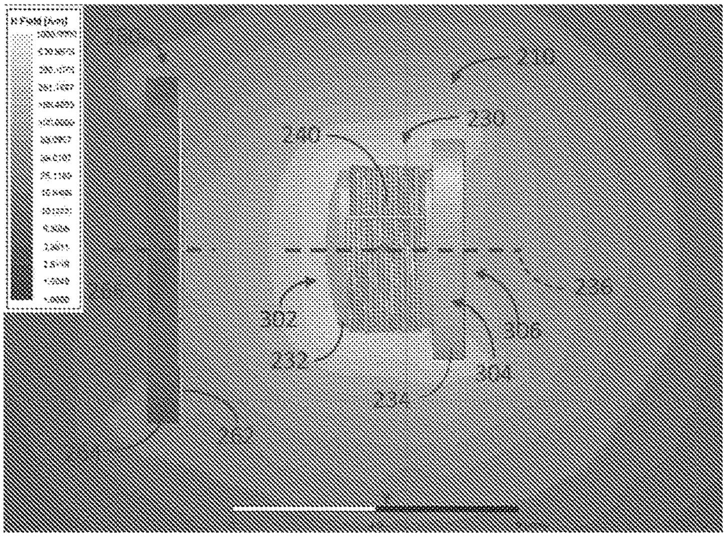
FIG. 5B schematically illustrates a simulation of an example time-varying magnetic field H(t) generated by the example core and coil of FIG. 5A in accordance with certain implementations described herein.

FIG. 5A schematically illustrates a side view of another example communication circuit 210 in accordance with certain implementations described herein. FIG. 5B schematically illustrates a simulation of an example time-varying magnetic field H(t) generated by the example communication circuit 210 of FIG. 5A in accordance with certain implementations described herein. The example communication circuit 210 of FIG. 5A is identical to the example communication circuit 210 of FIGS. 3A-3C, except that instead of being substantially flat as in FIGS. 3A-3C, the first magnetic pole surface 302 of FIG. 5A is convex (e.g., dome-shaped). For example, a center of the first magnetic pole surface 302 can extend a distance along the longitudinal axis from an edge of the first magnetic pole surface 302 in a range of 0 to 3 millimeters. For another example, the first magnetic pole surface 302 can be substantially spherical (e.g., a segment of a spherical surface having a radius of curvature in a range of 3 millimeters to 10 millimeters or higher). The magnetic induction coupling coefficient k for the example configuration shown in FIG. 5B, which has a convex and substantially spherical first magnetic pole surface 302 with a radius of curvature equal to 7 millimeters, is calculated to be 0.111 at a separation of 5 millimeters between the first magnetic pole surface 302 and the second antenna circuit 260.

Figure 6A:
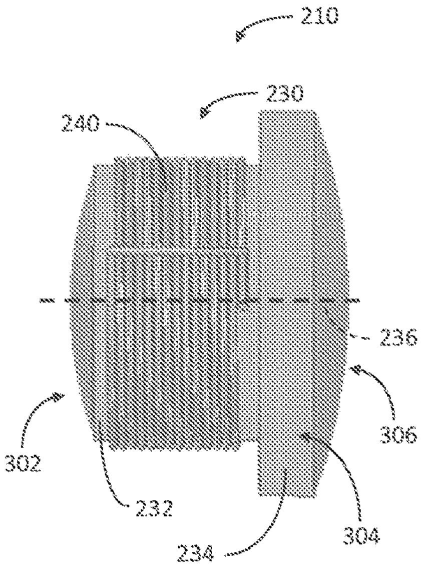
FIG. 6A schematically illustrates a side view of another example core and an example coil in accordance with certain implementations described herein.
Figure 6B:
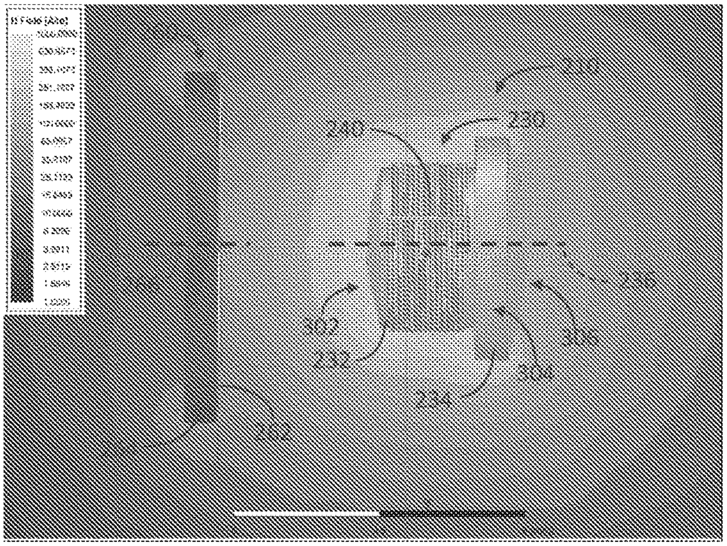
FIG. 6B schematically illustrates a simulation of an example time-varying magnetic field H(t) generated by the example core and coil of FIG. 6A in accordance with certain implementations described herein.

FIG. 6A schematically illustrates a side view of another example communication circuit 210 in accordance with certain implementations described herein. FIG. 6B schematically illustrates a simulation of an example time-varying magnetic field H(t) generated by the example communication circuit 210 of FIG. 6A in accordance with certain implementations described herein. The example communication circuit 210 of FIG. 6A is identical to the example communication circuit 210 of FIG. 5A, except that instead of being substantially flat as in FIG. 5A, the surface 306 of the second portion 234 that is opposite to the first magnetic pole surface 302 of FIG. 6A is convex (e.g., dome-shaped). For example, a center of the surface 306 can extend a distance along the longitudinal axis from an edge of the surface 306 in a range of 0 to 4 millimeters. For another example, the surface 306 can be substantially spherical (e.g., a segment of a spherical surface having a radius of curvature in a range of 4 millimeters to 14 millimeters or higher). The magnetic induction coupling coefficient k for the example configuration shown in FIG. 6B, which has a convex and substantially spherical surface 306 with a radius of curvature equal to 10 millimeters, is calculated to be 0.112 at a separation of 5 millimeters between the first magnetic pole surface 302 and the second antenna circuit 260. In a simulation for an example communication circuit 210 that has a substantially flat first magnetic pole surface 302 and a convex and substantially spherical surface 306 with a radius of curvature equal to 10 millimeters, is calculated to be 0.109 at a separation of 5 millimeters between the first magnetic pole surface 302 and the second antenna circuit 260. Thus, while the curved first magnetic pole surface 302 provided about a 3% improvement of the magnetic induction coupling coefficient k as compared to a flat first magnetic pole surface 302, the curved surface 306 only contributed an additional 1% improvement regardless of whether the first magnetic pole surface 302 was curved or not.

Figure 7A:
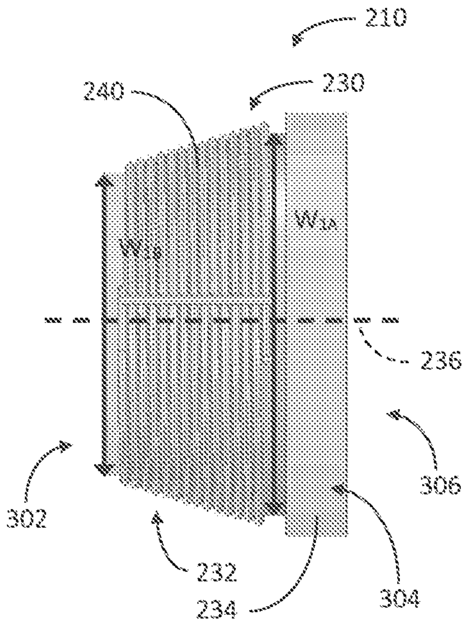
FIGS. 7A and 7B schematically illustrates side views of two other example cores and example coils in accordance with certain implementations described herein.
Figure 7B:
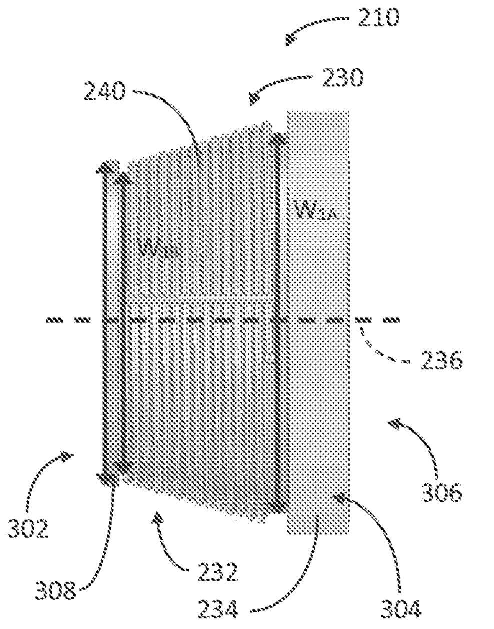

FIGS. 7A and 7B schematically illustrates side views of two other example communication circuits 210 in accordance with certain implementations described herein. Instead of having a substantially constant width $W_1$ (e.g., diameter) along the longitudinal axis 236 (see, e.g., FIGS. 3A-3C, 5A, 6A), the first portion 232 of FIGS. 7A and 7B is tapered. For example, the first portion 232 can have a width $W_1$ (e.g., diameter) that becomes smaller (e.g., monotonically; linearly) along the longitudinal axis 236 from the second portion 234 to the first magnetic pole surface 302. For example, the width $W_1$ can have a first value $W_{1A}$ at a first end (e.g., at the second portion 234) and a second value $W_{1B}$ at a second end (e.g., at the first magnetic pole surface 302), the second value $W_{1B}$ less than the first value $W_{1A}$ In certain implementations, the first portion 232 comprises a flange 308 at the first magnetic pole surface 302, the flange 308 having a third value $W_{1C}$ greater than the second value $W_{1B}$ and less than the first value $W_{1A}$ and configured to facilitate holding the windings of the coil 240 in place and/or simplifying the winding process. In certain implementations, the tapered first portion 232 can be combined with the curved first magnetic pole surface 302 and/or the curved surface 306 described herein.

Figure 8A:
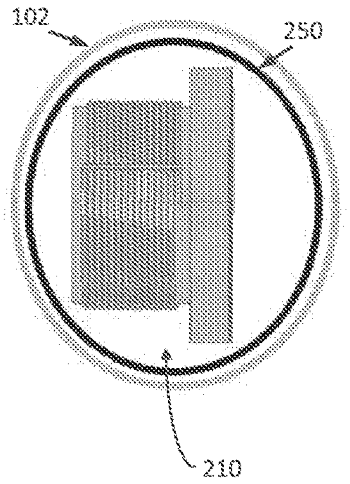
FIGS. 8A-8C schematically illustrate the example communication circuits of FIGS. 3A, 6A, and 7B within a schematic cross-sectional view of the housing within an inner surface of the ear canal of a recipient in accordance with certain implementations described herein.
Figure 8B:
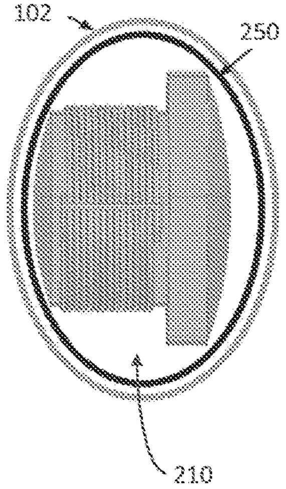
Figure 8C:
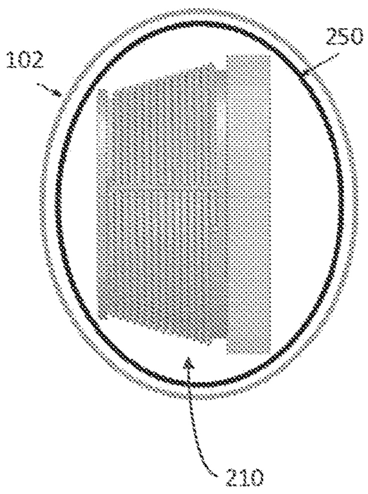

FIGS. 8A-8C schematically illustrate the example communication circuits 210 of FIGS. 3A, 6A, and 7B within a schematic cross-sectional view of the housing 250 within an inner surface of the ear canal 102 of a recipient in accordance with certain implementations described herein. The cross-sectional view is in a plane perpendicular to a longitudinal axis of a portion of the ear canal 102. In certain implementations, the housing 250 has a cross-sectional shape configured to fit within (e.g., conform to) the ear canal 102 and the communication circuit 120 is mounted within the housing 250 with a predetermined orientation within the housing 250 such that the housing 250 facilitates alignment of the communication circuit 210 such that the first magnetic pole surface 302 faces the implanted device 220 on the other side of the inner surface of the ear canal 102.

Figure 9A:
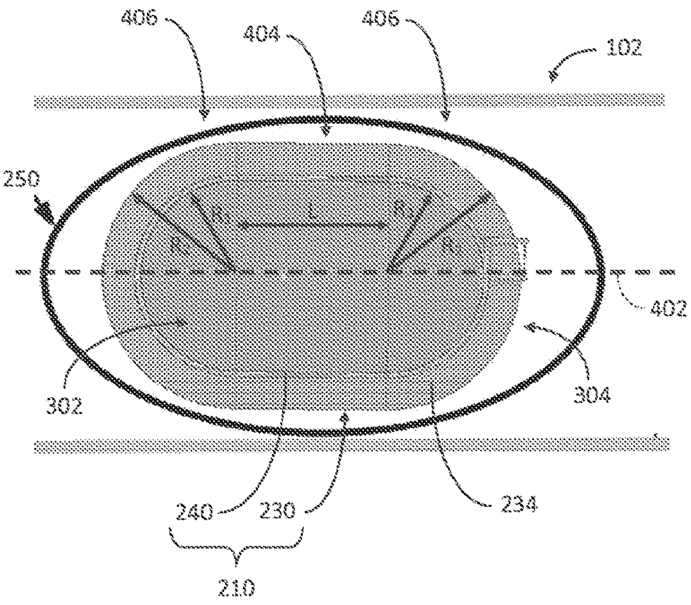
FIGS. 9A and 9B schematically illustrate an elevation view and a perspective view, respectively, of another example communication circuit in accordance with certain implementations described herein.
Figure 9B:
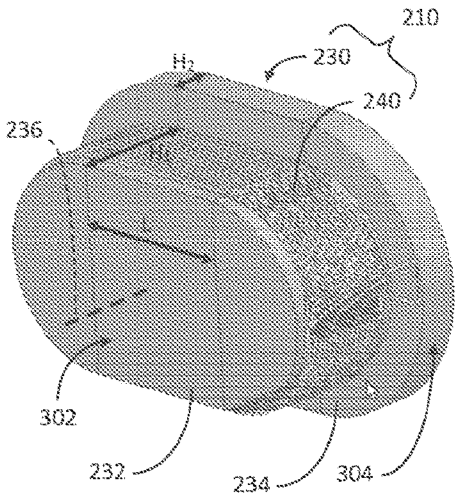

FIGS. 9A and 9B schematically illustrate an elevation view and a perspective view, respectively, of another example communication circuit 210 in accordance with certain implementations described herein. The elevation view of FIG. 9A is along a direction from the second element 120, so it can be termed a "top" view when the second element 120 is above the ear canal 102 (see, e.g., FIG. 1) or a "side" view when the second element 120 is positioned along a side of the ear canal 102 (e.g., in front of or behind the ear canal 102 of FIG. 1). The elevation view of the communication circuit 210 in FIG. 9A is shown within a schematic cross-sectional view of the housing 250 within an inner surface of the ear canal 102 of a recipient in accordance with certain implementations described herein. The cross-sectional view is in a plane along a longitudinal axis 402 of a portion of the ear canal 102. In certain implementations, the core 230 and the coil 240 of the communication circuit 210 have an elongated shape configured to extend along the longitudinal axis 402 of the ear canal 102. In the example communication circuit 210 shown in FIGS. 9A and 9B, the core 230 has a substantially obround cross-section (e.g., discorectangular; racetrack-shaped; stadium-shaped; sausage-shaped) in a plane substantially perpendicular to the longitudinal axis 236 of the core 230. The substantially obround cross-section of the core 230 can have a straight portion 404 between two curved (e.g., semi-circular) sections 406. For example, the straight section can have a length L in a range of 1 millimeter to 12 millimeters (e.g., 4 millimeters), the two semi-circular sections of the first portion 232 can have a radius $R_1$ in a range of 1 millimeter to 5 millimeters (e.g., 2.5 millimeters), and the two semi-circular sections of the second portion 234 can have a radius $R_2$ in a range of 1.25 millimeters to 6 millimeters (e.g., 3.5 millimeters). The first portion 232 of the core 230 around which the coil 240 is wound has a first width (e.g., $2 \cdot R_1$) in a first cross-sectional plane comprising the longitudinal axis 236 of the core 230 and a second width (e.g., $L+2 \cdot R_1$) in a second cross-sectional plane comprising the longitudinal axis 236 of the core 230 and substantially perpendicular to the first cross-sectional plane, the second width greater than the first width. The second portion 234 of the core 230 has a third width (e.g., $2 \cdot R_2$) in the first cross-sectional plane and a fourth width (e.g., $L+2 \cdot R_2$) in the second cross-sectional plane, the fourth width greater than the third width. While the example communication circuit 210 of FIGS. 9A and 9B has a substantially flat first magnetic pole surface 302, in certain implementations, the first magnetic pole surface 302 and/or the surface 306 (not shown in FIGS. 9A and 9B) can be convex as described herein with regard to FIGS. 5A and 6A. While the example first portion 232 of the core 230 of FIGS. 9A and 9B has a substantially constant cross-sectional width and length as a function of distance along the longitudinal axis 236, in certain implementations, the first portion 232 of the core 230 can be tapered as described herein with regard to FIGS. 7A and 7B.

In certain implementations, the elongated shape of the communication circuit 210 is configured to, as compared to a non-elongated shape, increase the magnetic induction coupling coefficient with the device 220 and/or reduce degradation of the magnetic induction coupling coefficient due to misalignment (e.g., offset) between the communication circuit 210 and the device 220. For example, for an apparatus 200 configured to be inserted into the ear canal 102 by the recipient, such misalignment can be a common issue (e.g., if the apparatus 200 does not have magnets configured to align the communication coil 210 with that of the device 220) since the distance along the ear canal 102 at which the apparatus 200 is placed may be different each time it is inserted.

Figure 10A:
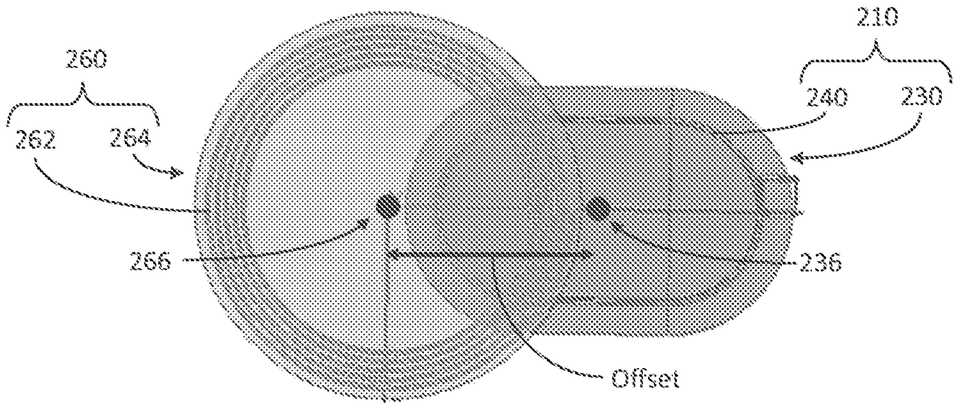
FIG. 10A schematically illustrates an elevation view of the example communication circuit of FIGS. 9A and 9B below an example a disc-shaped antenna core in accordance with certain implementations described herein.
Figure 10B:
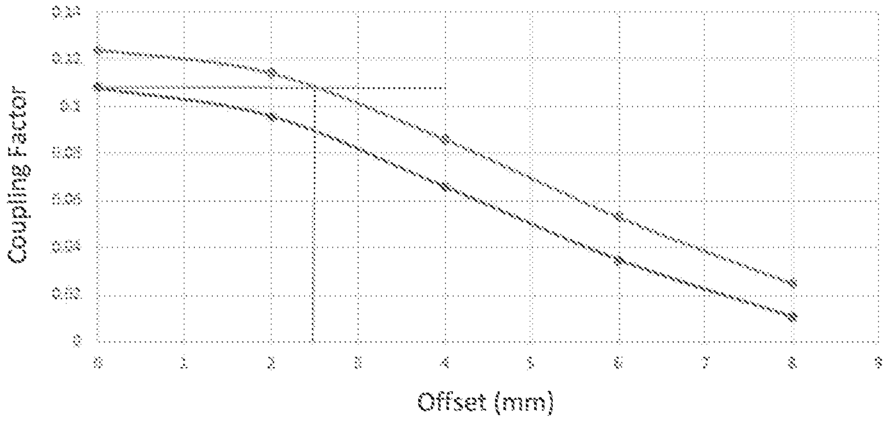
FIG. 10B show plots of the magnetic induction coupling coefficient as a function of the offset for (i) the example communication circuit of FIGS. 9A and 9B having the elongated shape and (ii) the example communication circuit of FIGS. 3A-3C in accordance with certain implementations described herein.

FIG. 10A schematically illustrates an elevation view of the example communication circuit 210 of FIGS. 9A and 9B below an example a disc-shaped antenna core 264 in accordance with certain implementations described herein. The center longitudinal axis 236 of the core 230 is offset from the center longitudinal axis of the antenna core 264 in a direction perpendicular to the longitudinal axes 236, 266. FIG. 10B show plots of the magnetic induction coupling coefficient k as a function of the offset for (i) the example elongated communication circuit 210 of FIGS. 9A and 9B having the elongated shape (with length L=4 millimeters, radius $R_1$=2.5 millimeters, radius $R_2$=3.5 millimeters, height $H_1$=3 millimeters, height $H_2$=1 millimeter) and (ii) the example round communication circuit 210 of FIGS. 3A-3C (with width $W_1$=5 millimeters, width $W_2$=7 millimeters, height $H_1$=3 millimeters, height $H_2$=1 millimeter) in accordance with certain implementations described herein. For both plots of FIG. 10B, the distance between the first magnetic pole surface 302 and the antenna coil 262 is 5 millimeters.

As seen in FIG. 10B, the round communication circuit 210 of FIGS. 3A-3C with zero offset has a magnetic induction coupling coefficient k of 0.108 and the coupling coefficient k is reduced as the offset increases, to a value below 0.10 at an offset of about 1.5 millimeters. The elongated communication circuit 210 of FIGS. 9A-9B with zero offset has a magnetic induction coupling coefficient k of 0.122 and the coupling coefficient k is reduced as the offset increases, to a value below 0.108 at an offset of about 2.5 millimeters and to a value below 0.10 at an offset of about 3 millimeters. This comparison of the two example communication circuits 210 shows that the elongated shape provides larger magnetic induction coupling coefficients at zero misalignment (e.g., offset) of the communication circuit 210 to the device 220 while also retaining coupling coefficients greater than 0.10 even with substantial non-zero misalignments (e.g., offsets). In the example of FIG. 10B, for offsets up to 2.5 mm, the coupling coefficient of the 4-mm elongated communication circuit 210 is greater than the coupling coefficient of the round communication circuit 210 with zero offset. In certain implementations, an apparatus 200 comprising an elongated-shaped communication circuit 210 provides a useable RF link efficiency while allowing for some misalignment between the communication circuit 210 and the communication circuit 260 of the implanted device 220.

In certain implementations, the apparatus 200 comprises other features and functionalities. For example, the apparatus 200 can comprise a microcontroller (e.g., a processor integrated circuit) configured to monitor performance of and/or to provide signals to various components of the apparatus 200 (e.g., to adjust performance parameters of the at least one communication circuit 210, and/or one or more other components of the apparatus 200). In certain such implementations, the microcontroller is configured to wirelessly receive control signals from an external device (e.g., control signals encoded onto the at least one signal wirelessly received from the implantable device 220). For another example, the apparatus 200 can comprise power storage circuitry (e.g., one or more batteries, rechargeable batteries, non-rechargeable batteries, capacitors, or other power storage devices) configured to store power and to provide the power to other components of the apparatus 200 and/or power reception circuitry configured to wirelessly receive power and to provide the power to other components of the apparatus 200 (e.g., the power storage circuitry). Examples of power reception circuitry can include, but are not limited to: a coil configured to move within a magnetic field (e.g., a dynamic microphone coil of the apparatus 200); a piezoelectric element (e.g., PVDF membrane of a piezoelectric microphone of the apparatus 200) responding to frequencies outside of the human audible range; circuitry configured to wirelessly receive electrical power from a dedicated source (e.g., a pillow charger); circuitry configured to extract electrical power from signals wirelessly received by the apparatus 200 (e.g., the at least one signal from the implanted device); thermoelectric, piezoelectric, or radio-frequency (RF) transducers configured to harvest power from energy received from the ambient environment of the apparatus 200 (e.g., thermal energy; kinetic energy; RF energy) and to convert the harvested power into electrical power.

Figure 11:
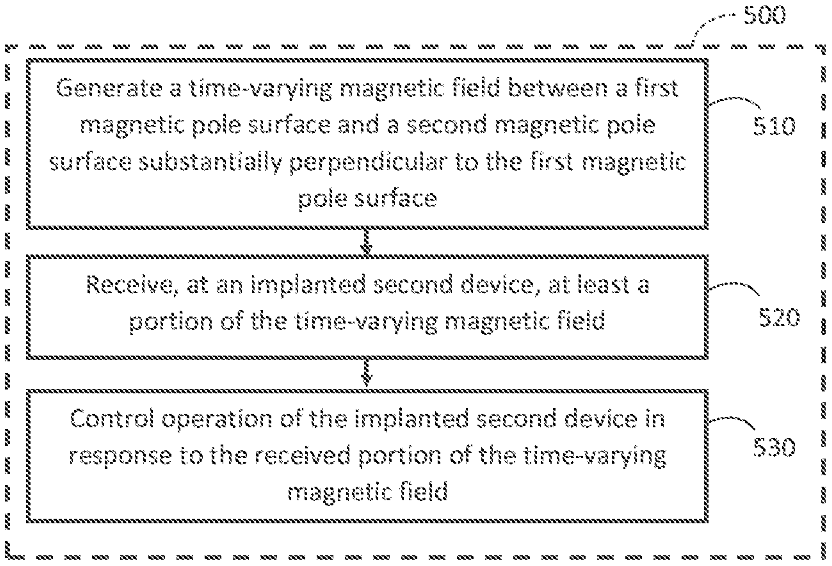
FIG. 11 is a flow diagram of an example method in accordance with certain embodiments described herein.

FIG. 11 is a flow diagram of an example method 500 in accordance with certain implementations described herein. In an operational block 510, the method 500 comprises generating a time-varying magnetic field H(t) between a first magnetic pole surface 302 and a second magnetic pole surface 304 of a first device positioned on or within a recipient's body. The second magnetic pole surface 304 is substantially perpendicular to the first magnetic pole surface 302. In certain implementations, the first device comprises a transducer assembly (e.g., comprising at least one microphone and/or sensor) within a cavity or region of the recipient's body (e.g., positioned within an ear canal 102 of the recipient) or on the recipient's body (e.g., worn externally by the recipient).

In an operational block 520, the method 500 further comprises receiving, at an implanted second device within the recipient's body, at least a portion of the time-varying magnetic field H(t. In certain implementations, the second device comprises a stimulation assembly (e.g., comprising at least one electrode and/or at least one actuator) configured to apply stimulation signals to a corresponding portion of the recipient's body.

In an operational block 530, the method 500 further comprises controlling operation of the implanted second device in response to the received portion of the time-varying magnetic field H(t). For example, the implanted second device can be switched between multiple operational states (e.g., states utilizing different power levels; on and off states; operational and diagnostic states) in response to the received portion of the time-varying magnetic field H(t). The time-varying magnetic field H(t) can be indicative of data (e.g., information; commands) from the first device, the method 500 can further comprise determining the data from the received portion of the time-varying magnetic field H(t), and said controlling operation can comprise using the data for information and/or commands for operating within the operational state of the implanted second device.

In certain implementations, the method 500 further comprises wirelessly receiving second data (e.g., information; commands) from the implanted second device and controlling operation of the first device in response to the second data. For example, the first device can be switched between multiple operational states (e.g., states utilizing different power levels; on and off states; operational and diagnostic states) and/or the second data can include information and/or commands for operating within the operational state of the first device.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It is to be appreciated that the implementations disclosed herein are not mutually exclusive and may be combined with one another in various arrangements. In addition, although the disclosed methods and apparatuses have largely been described in the context of conventional auditory prostheses (e.g., cochlear implants), various implementations described herein can be incorporated in a variety of other suitable devices, methods, and contexts. More generally, as can be appreciated, certain implementations described herein can be used in a variety of implantable medical device contexts.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the methods and systems are discussed herein in terms of elements labeled by ordinal adjectives (e.g., first, second, etc.), the ordinal adjective are used merely as labels to distinguish one element from another (e.g., one signal from another or one circuit from one another), and the ordinal adjective is not used to denote an order of these elements or of their use.

The invention described and claimed herein is not to be limited in scope by the specific example implementations herein disclosed, since these implementations are intended as illustrations, and not limitations, of several aspects of the invention. Any equivalent implementations are intended to be within the scope of this invention. Indeed, various modifications of the invention in form and detail, in addition to those shown and described herein, will become apparent to those skilled in the art from the foregoing description. Such modifications are also intended to fall within the scope of the claims. The breadth and scope of the invention should not be limited by any of the example implementations disclosed herein, but should be defined only in accordance with the claims and their equivalents.

What is claimed is:

1. An apparatus comprising:

at least one communication circuit configured to receive transducer output signals generated by at least one transducer, to generate communication signals in response to the transducer output signals, and to inductively communicate the communication signals to at least one device implanted on or within a recipient, the at least one communication circuit comprising:

at least one core configured to be positioned within a cavity or region of the recipient's body, the at least one core comprising a first portion and a second portion, the first portion extending along a longitudinal axis and the second portion extending outwardly from the first portion and substantially perpendicular to the longitudinal axis, the first portion having a first width perpendicular to the longitudinal axis at a first magnetic pole surface, the second portion having a second width perpendicular to the longitudinal axis at a second magnetic pole surface, with a difference between the second width and the first width in a range of 0.5 millimeter to 4 millimeters; and at least one electrically conductive coil encircling the first portion and configured to be positioned within the cavity or region.

2. The apparatus of claim 1, further comprising a housing configured to be positioned within the cavity or region, the at least one core and the at least one electrically conductive coil positioned on or within the housing.

3. The apparatus of claim 2, wherein the housing comprises a non-magnetic material.

4. The apparatus of claim 2, wherein the cavity or region comprises an ear canal of the recipient's body and the housing is configured to be positioned within the ear canal with the longitudinal axis of the first portion of the at least one core pointing towards an inner surface of the ear canal.

5. The apparatus of claim 2, further comprising the at least one transducer and the at least one transducer is on or within the housing.

6. The apparatus of claim 2, wherein the at least one transducer comprises a microphone configured to respond to sound by generating the transducer output signals, the transducer output signals indicative of the sound.

7. The apparatus of claim 2, wherein the first portion of the at least one core has a substantially circular cross-section in a plane substantially perpendicular to the longitudinal axis.

8. The apparatus of claim 1, wherein the first portion of the at least one core has a substantially obround cross-section in a plane substantially perpendicular to the longitudinal axis.

9. An apparatus comprising:

at least one antenna configured to generate time-varying magnetic fields that inductively couple the at least one antenna to an implanted device on or within a recipient, the at least one antenna comprising:

at least one core and at least one electrically conductive coil wound around at least a portion of the at least one core;

a first magnetic pole surface configured to be facing in a direction substantially towards the implanted device; and a second magnetic pole surface configured to be facing substantially perpendicular to the direction, wherein the portion of the at least one core is substantially rotationally symmetric about the direction or has a first width in a first cross-sectional plane comprising the direction and a second width in a second cross-sectional plane comprising the direction and substantially perpendicular to the first cross-sectional plane, the second width greater than the first width.

10. The apparatus of claim 9, wherein the at least one antenna is configured to be positioned within an ear canal of the recipient and the direction is substantially perpendicular to a longitudinal axis of the ear canal.

11. The apparatus of claim 10, wherein the apparatus is an auditory prosthesis comprising at least one microphone, the at least one antenna configured to be positioned within an ear canal of the recipient.

12. The apparatus of claim 11, wherein the implanted device comprises at least one of: an electrode array, a middle ear actuator, a direct acoustic cochlear implant actuator, and a bone conduction actuator.

13. The apparatus of claim 9, wherein the first magnetic pole surface is convex.

14. The apparatus of claim 9, wherein the at least one antenna further comprises a convex surface that is opposite to the first magnetic pole surface.

15. The apparatus of claim 9, wherein the at least one antenna is tapered along the direction.

16. A method comprising:

generating a time-varying magnetic field between a first magnetic pole surface and a second magnetic pole surface of a first device positioned on or within a recipient's body, the first magnetic pole surface facing towards an implanted second device within the recipient's body and the second magnetic pole surface substantially perpendicular to the first magnetic pole surface;

receiving, at the implanted second device within the recipient's body, at least a portion of the time-varying magnetic field; and controlling operation of the implanted second device in response to the received portion of the time-varying magnetic field.

17. The method of claim 16, wherein the first device comprises a transducer assembly within a cavity or region of the recipient's body or on the recipient's body.

18. The method of claim 16, wherein controlling operation comprises switching the implanted second device between multiple operational states.

19. The method of claim 16, wherein the time-varying magnetic field is indicative of data, the method further comprises determining the data from the received portion of the time-varying magnetic field, and said controlling operation comprises using the data for information and/or commands for operating within an operational state of the implanted second device.

20. The method of claim 19, wherein the implanted second device comprises a stimulation assembly configured to apply stimulation signals to a corresponding portion of the recipient's body and said controlling operation comprises adjusting the stimulation signals.

21. The method of claim 16, wherein the time-varying magnetic field is configured to transmit power from the first device to the second device.

22. The method of claim 16, further comprises wirelessly receiving second data from the implanted second device and controlling operation of the first device in response to the second data.

23. The apparatus of claim 1, wherein the first portion and the second portion are joined to one another.

24. The apparatus of claim 1, wherein the first portion and the second portion are reversibly separatable from one another.

25. The apparatus of claim 1, wherein the first portion has an obround cross-sectional shape in a first plane perpendicular to the longitudinal axis, the second portion has an obround cross-sectional shape in a second plane perpendicular to the longitudinal axis, the at least one communication circuit configured to retain a magnetic induction coupling coefficient greater than 0.10 with the at least one device despite misalignment of the at least one core relative to the at least one device of up to 2.5 millimeters in a direction perpendicular to the longitudinal axis.

26. The apparatus of claim 1, wherein the first portion and the second portion are unitary with one another.

27. The apparatus of claim 1, wherein the at least one communication circuit is configured to inductively communicate with the at least one device with a magnetic induction coupling coefficient greater than 0.10 with the at least one device.

* * * * *